(12) United States Patent  (10) Patent No.: US 6,652,156 B2
Shinagawa et al.  (45) Date of Patent: Nov. 25, 2003

(54) OPTICAL CONNECTOR PLUG (75) Inventors: Yuji Shinagawa, Tokyo (JP); Koji Ozaki, Tokyo (JP); Mikio Hojo, Tokyo (JP); Daisuke Hayasaka, Yonezawa (JP); Satoru Nozawa, Yonezawa (JP); Ryosuke Kudo, Yonezawa (JP)

(73) Assignees: Sanwa Denki Kogyo Co., Ltd., Tokyo (JP); Yonezawa Densen Co., Ltd., Yamagata-Ken (JP)

( * ) Notice: Subject to any disclaimer, the term of this patent is extended or adjusted under 35 U.S.C. 154(b) by 0 days.

(21) Appl. No.: 09/984,881

(22) Filed: Oct. 31, 2001

(65) Prior Publication Data

US 2002/0085815 A1 Jul. 4, 2002

(30) Foreign Application Priority Data

Oct. 31, 2000 (JP) ........................................ 2000-332699

(51) Int. Cl.$^7$ ................................................ G02B 6/36
(52) U.S. Cl. .............................. 385/78; 385/77; 385/81
(58) Field of Search ............................... 385/53–87, 77, 385/78, 81

(56) References Cited

U.S. PATENT DOCUMENTS

| 5,633,970 | A | * | 5/1997 | Olson et al. | 385/78 |
| 5,809,192 | A | * | 9/1998 | Manning et al. | 385/78 |
| 6,030,129 | A | * | 2/2000 | Rosson | 385/81 |
| 6,318,903 | B1 | * | 11/2001 | Andrews et al. | 385/77 |

* cited by examiner

Primary Examiner—Hemang Sanghavi
Assistant Examiner—Scott A Knauss
(74) Attorney, Agent, or Firm—Israel Gopstein (57) ABSTRACT An optical connector plug includes a holder having a ferrule at one end thereof, a stop ring for supporting the ferrule in a predetermined direction, a plug frame for rotatably supporting and incorporating the stop ring in an axial direction, and a coil spring interposed between the holder and the stop ring, for energizing the ferrule to the front in the plug frame, wherein the holder and the stop ring have engaging portions with which they are mutually engaged, and an optical axis of the ferrule is adjusted in a single step by rotating the stop ring and fixing the plug frame or by rotating the plug frame and fixing the stop ring, and an adjusted position is fixed by pressure generated by pressing the spring to the holder and by using an adhering agent which is filled between the plug frame and the stop ring.

5 Claims, 9 Drawing Sheets

OPTICAL CONNECTOR PLUG

BACKGROUND OF THE INVENTION

1. Field of the Invention

The present invention relates to an optical connector plug which is used for connecting optical cables for an optical communication system.

2. Description of the Related Art

An optical connector plug a, as a conventional art, as shown in FIGS. 9 to 12 comprises: an optical fiber cable b; an optical fiber c which is exposed by exfoliating a coating of a front end of the optical fiber cable b; a microhole d which pierces an axis of the optical fiber c; a holder e; a ferrule f in which the optical fiber c penetrates the microhole d and is fixed and which is armored and fixed at a rear end thereof by the holder e; a coil spring g which is armored by a rear portion of the holder e and is interposed between a stop ring i and an enlarging portion $e_1$ at a front end of the holder e; a pair of arcuate projected bands h; the stop ring i, which is armored by the rear portion of the holder e from a substantially intermediate portion and on which the pair of arcuate projected bands h is symmetrically provided for a circumferential wall of the optical fiber c in the circumferential direction; four groove portions j which are provided at the enlarging portion $e_1$ of the holder e; two latching projected bands k which are latched together to the four groove portions j to be opposed to each other, at a substantially intermediate portion of an inside wall of the optical fiber c; a pair of engaging holes 1 with which the pair of the arcuate projected bands h of the stop ring i is engaged; and a plug frame m which the pair of engaging holes 1 pierces to be opposed to each other.

Figure 13:
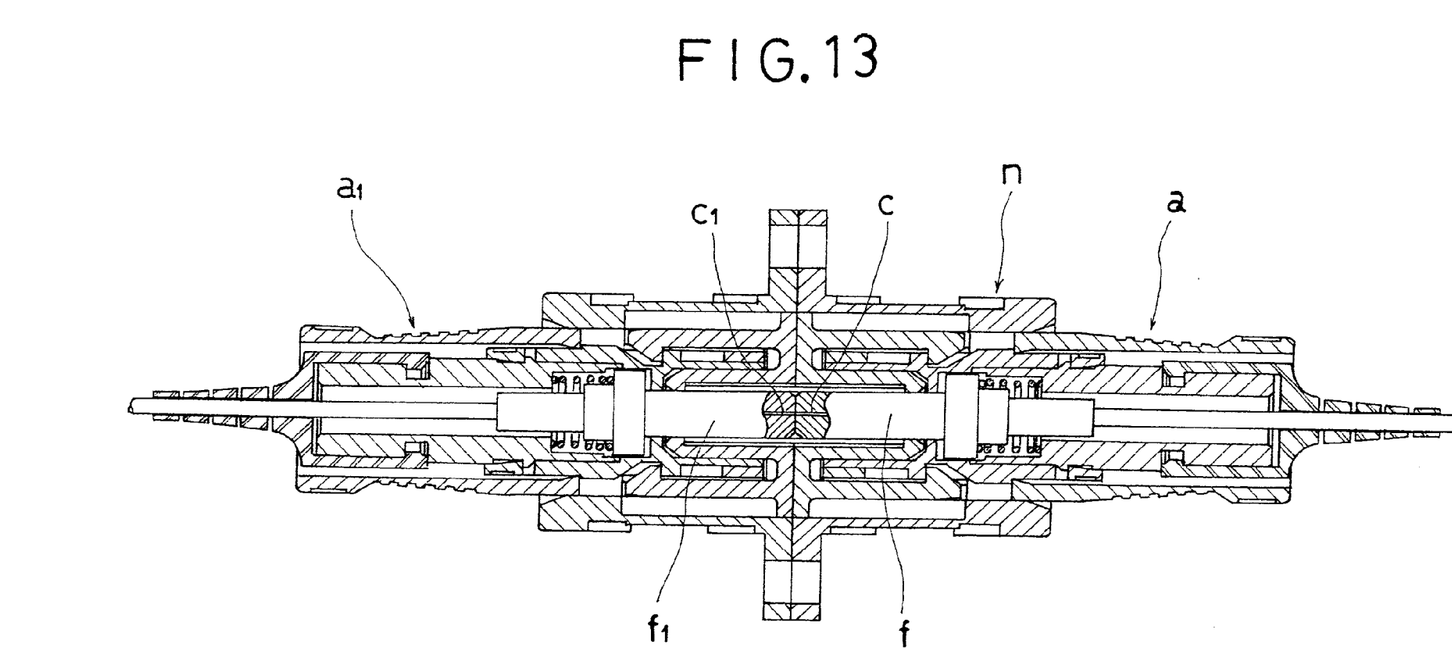
FIG. 13 is a sectional view in the case of fitting one optical connector plug, as a conventional art, into an optical adapter into which another optical connector plug is fit and of connecting cores of the optical adapter and the one optical connector plug so that both the cores face each other.
Figure 14:
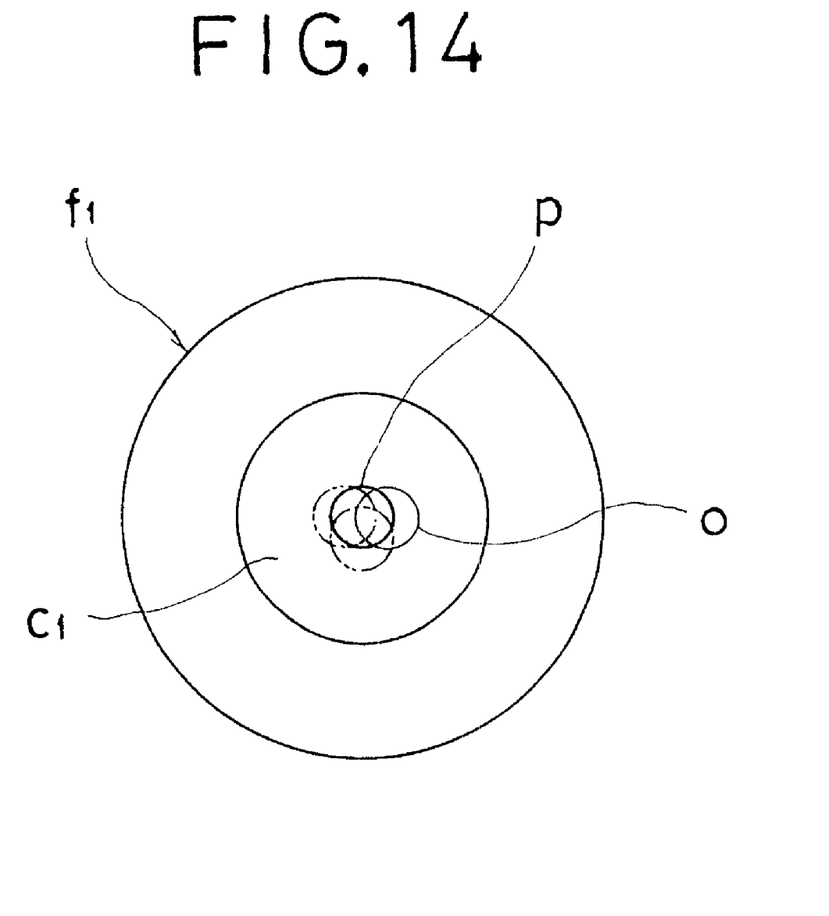
FIG. 14 is an explanatory diagram showing an eccentric error between a core of one optical connector plug as a conventional art and a core of another connector plug when both the optical connector plugs face each other.

In the optical connector plug a as the conventional art, the stop ring i and the plug frame m are combined and fixed and the stop ring i is unrotatable. To reduce an eccentric error, the ferrules f are positioned, that is, the eccentricity between optical axes of the ferrules f is corrected in advance upon assembly. However, in general, a core of the optical fiber is eccentric in some degree in terms of the accuracy upon manufacturing. As shown in FIGS. 13 and 14, when a core o of an optical fiber c in one optical connector plug a is connected to a core p of an optical fiber $c_1$ in another optical connector plug $a_1$ to face each other, the optical axes of the cores o and p are made eccentric and, thus, the loss of the connection is also caused.

Incidentally, referring to FIGS. 13 and 14, reference symbol f denotes a ferrule of the one optical connector plug a and $f_1$ denotes a ferrule of the other optical connector plug $a_1$.

Further, conventionally, an optical connector plug, as a mechanism for correcting the eccentricity of optical axes of ferrules after assembly, is put into practical use. In the optical connector plug, a positioning key is arranged to fix the ferrules to a determined position at which the loss of the connection is the most small by rotating the ferrules. However, since adjustment in a single step is impossible, the precise correction cannot be performed against the eccentricity of the optical axes.

SUMMARY OF THE INVENTION

To solve the above-mentioned problems in the conventional optical connector plugs, it is an object of the present invention to provide an optical connector plug, in which the eccentricity of optical axes of ferrules integral with a stop ring can be adjusted in a single step and can precisely be corrected by rotating the stop ring relative to a plug frame after assembling the optical connector plug, and the ferrules can easily and certainly be fixed to a correcting position without using a positioning key.

To accomplish the above-mentioned object, according to a first aspect of the present invention, there is provided an optical connector plug comprising: a holder having a ferrule at one end thereof; a stop ring for supporting the ferrule in a predetermined direction; a plug frame for rotatably supporting and incorporating the stop ring in an axial direction; and a coil spring interposed between the holder and the stop ring, for energizing the ferrule to the front in the plug frame, wherein the holder and the stop ring have engaging portions with which they are mutually engaged, and an eccentric error of an optical axis of the ferrule is adjusted in a single step by rotating the stop ring and fixing the plug frame or by rotating the plug frame and fixing the stop ring, and an adjusted position is fixed by pressure generated by pressing the spring to the holder.

According to a second aspect of the present invention, there is provided an optical connector plug comprising: a holder having a ferrule at one end thereof; a stop ring for supporting the ferrule in a predetermined direction; a plug frame for rotatably supporting and incorporating the stop ring in an axial direction; and a coil spring interposed between the holder and the stop ring, for energizing the ferrule to the front in the plug frame, wherein the holder and the stop ring have engaging portions with which they are mutually engaged, and an optical axis of the ferrule is adjusted in a single step by rotating the stop ring and fixing the plug frame or by rotating the plug frame and fixing the stop ring, and an adjusted position is fixed by pressure generated by pressing the spring to the holder and by using an adhering agent which is filled between the plug frame and the stop ring.

According to a third aspect of the present invention, there is provided an optical connector plug comprising: a holder having a ferrule at one end thereof; a stop ring for supporting the ferrule in a predetermined direction; a plug frame for rotatably supporting and incorporating the stop ring in an axial direction; and a coil spring interposed between the holder and the stop ring, for energizing the ferrule to the front in the plug frame, wherein the holder and the stop ring have engaging portions with which they are mutually engaged, and the entire of the stop ring is formed as a single substantially-cylindrical structure, and the stop ring is rotated round the axis in the plug frame and is fit while it is prevented from the movement in the axial direction.

Preferably, in the optical connector plug, the engaging portion of the holder may be a latching groove, and the engaging portion of the stop ring may be an engaging projection.

Preferably, in the optical connector plug, the engaging portion of the holder may be a latching projection, and the engaging portion of the stop ring may be a latching groove.

Preferably, in the optical connector plug, a pair of latching holes, which penetrates a circumferential wall of the plug frame to be opposed to each other, may be provided for the circumferential wall and a ring-shaped projected band for being fit into the latching hole may be provided for a circumferential portion of the stop ring.

The ferrule is rotatably inserted in the center of the inside of the plug frame around the axis thereof and, thereafter, the coil spring is interposed between the ferrule and the holder and the front portion of the stop ring is pressed and is fit into the plug frame. Then, the target portions at the peripheral edges in the ring-shaped projected bands, which are arranged to the periphery of the stop ring, are fit into the pair of latching holes that are formed by penetrating a circumferential wall of the plug frame to be opposed to each other. In this case, the engaging portions at the end of the stop ring are latched together to the engaging portions of the holder and, then, the assembling operation is completed.

One optical connector plug having the above structure is fit into an optical adapter from one opening of the optical connector. A ferrule of the one optical plug faces a ferrule of another optical connector plug which is fit into the optical adapter from another opening. Thus, cores of both the ferrules are connected to face each other.

The eccentric error upon connecting both the ferrules is detected by a well-known detector. If there is an eccentric error, the stop ring is rotated around the axis thereof while the optical connector plug is fit and hold into the optical adapter. Then, the stop ring is rotated around the axis thereof in a single step, relative to the plug frame and, consequently, the ferrules are rotated round the axis via the holder having the engaging portions which are engaged with the engaging portion of the stop ring.

The stop ring is rotated while the detector detects the eccentric error which is caused by connecting the cores of the ferrules. Then, the stop ring stops rotating at the position at which the eccentric error is absent or at the position at which the eccentric error is the smallest, thereby adjusting the eccentric error. By stopping rotating the stop ring at the adjusted position, the stop ring is fixed by pressure generated by pressing the coil spring to the holder. Further, the adhering agent is filled between the plug frame and the stop ring, thereby fully being fixed.

In the present invention, as mentioned above, the eccentric error can be adjusted in a single step and the adjusted position can be fixed by rotating the ferrule, that is, the optical fiber in the circumferential direction, relative to the plug frame. Therefore, the eccentric error can be reduced as much as possible and the connecting loss upon facing the both cores of the ferrules can greatly be reduced.

After assembling the optical connector plug, the ferrule, in other words, the optical fiber can be rotated at the same position without the forward and backward movement by rotating the stop ring together with the coil spring and boot in the circumferential direction, relative to the plug frame. Thus, the eccentric error of the both cores can easily and accurately be adjusted, and the connecting loss upon facing the both cores can greatly be reduced.

DESCRIPTION OF THE PREFERRED EMBODIMENTS

A description is given of an optical connector plug according to a first embodiment of the present invention with reference to the drawings.

Figure 1:
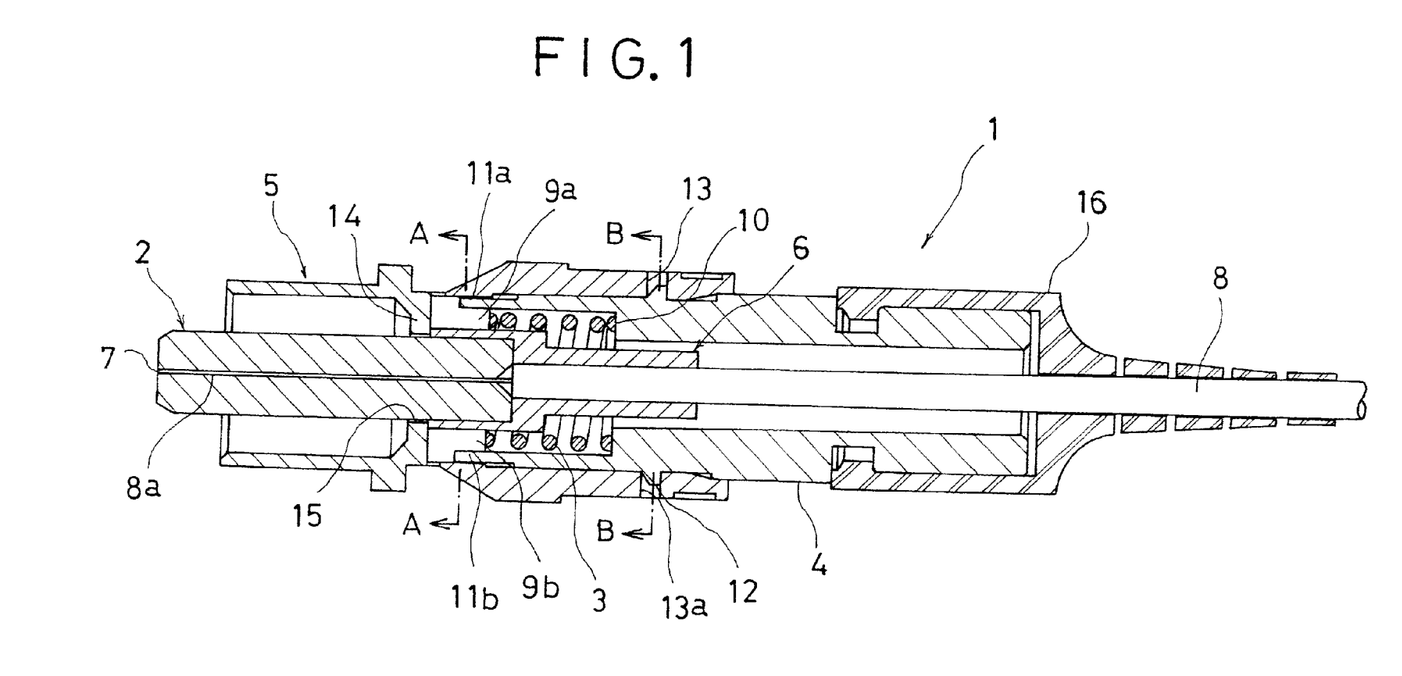
FIG. 1 is a longitudinal sectional view of an optical connector according to a first embodiment of the present invention.
Figure 2:
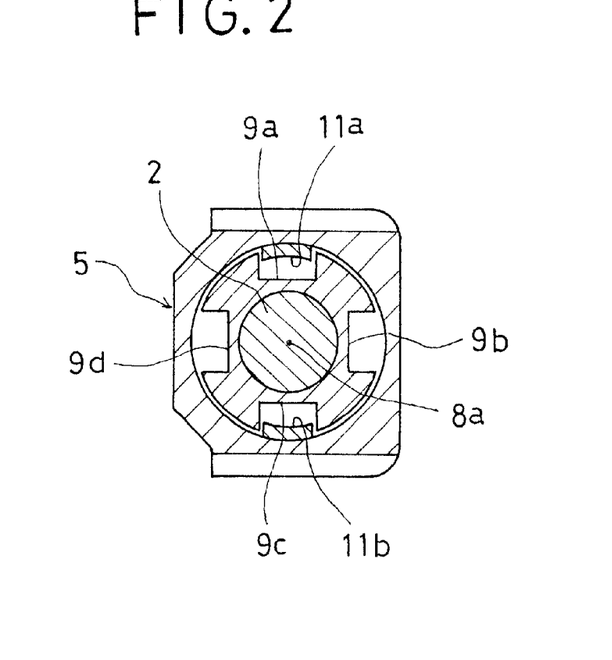
FIG. 2 is a sectional view taken on arrow A—A in FIG. 1.
Figure 3:
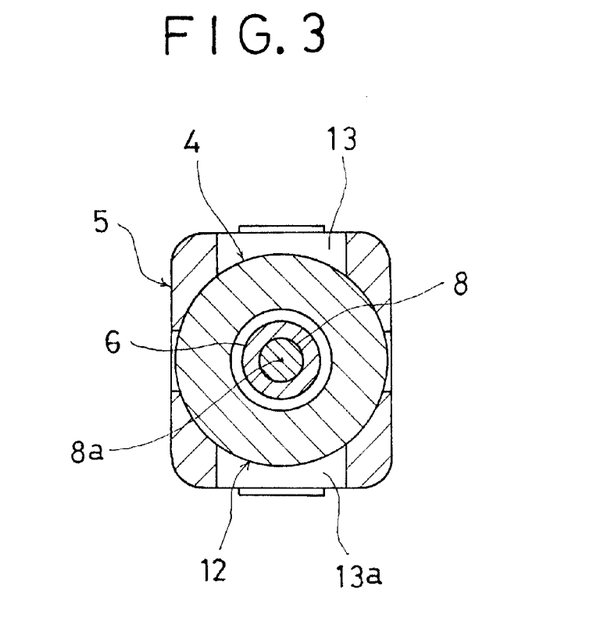
FIG. 3 is a sectional view taken on arrow B—B in FIG. 1.
Figure 4:
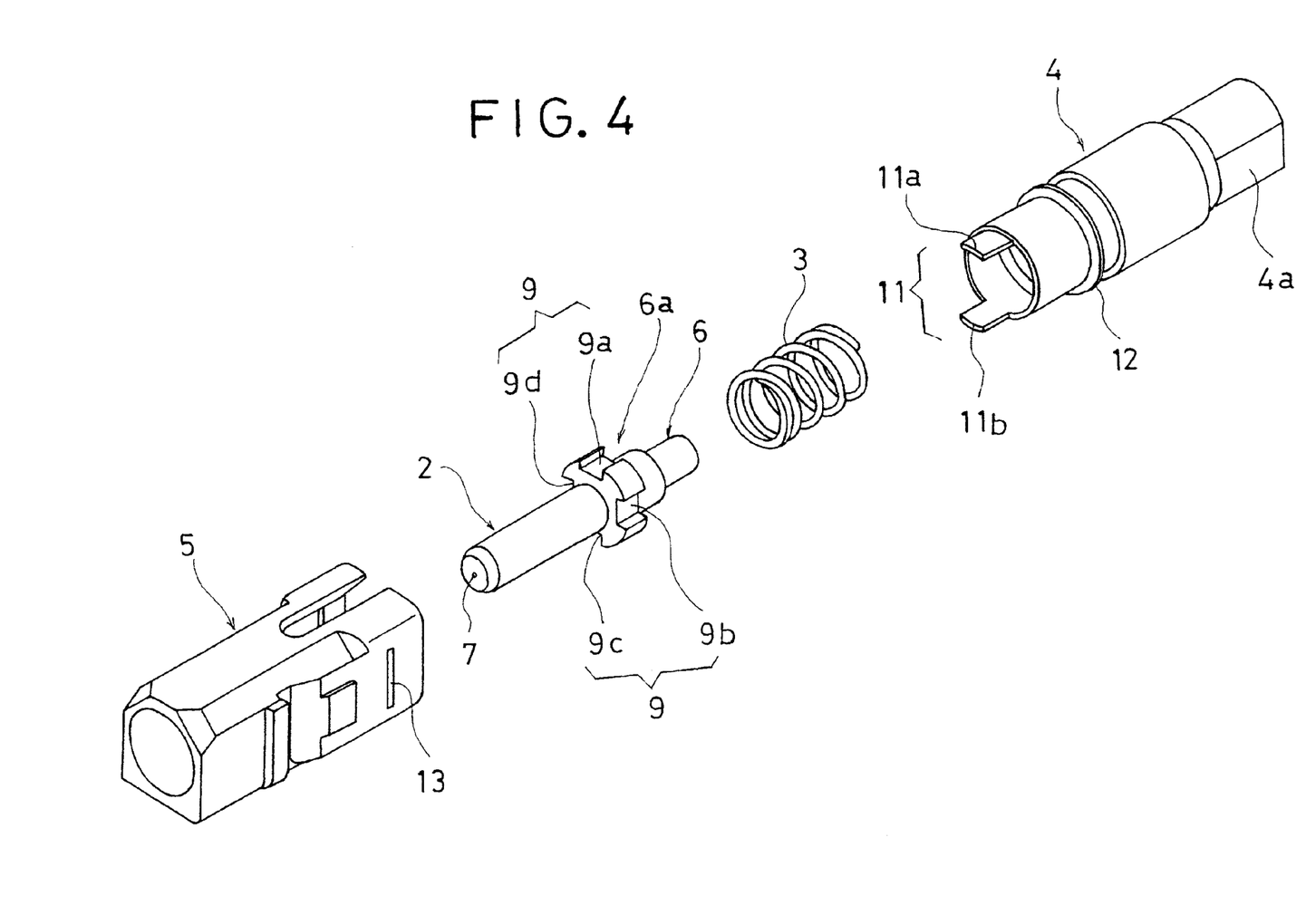
FIG. 4 is an exploded perspective view of the optical connector plug in FIG. 1.
Figure 5:
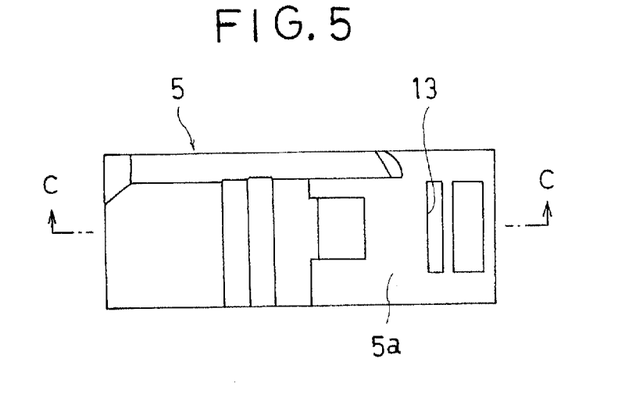
FIG. 5 is a side view of a plug frame of the optical connector plug in FIG. 1.
Figure 6:
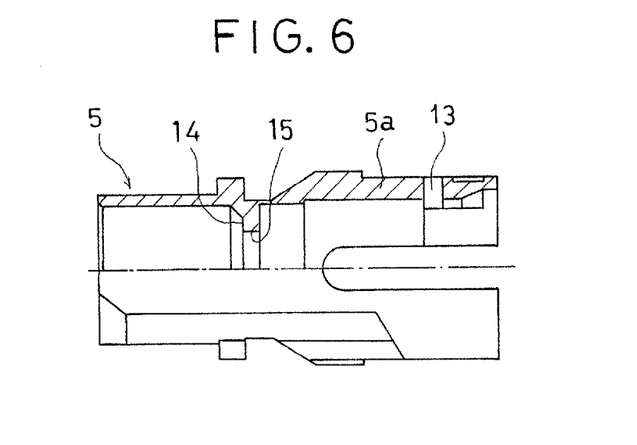
FIG. 6 is a half sectional view taken on arrow C—C in FIG. 5.
Figure 7:
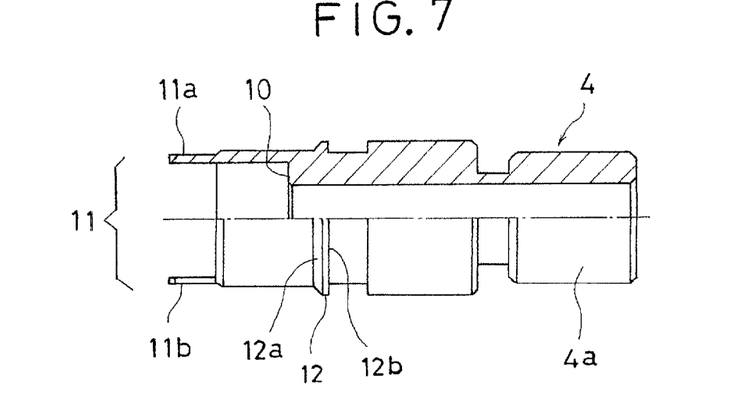
FIG. 7 is a half sectional view of a stop ring in the optical connector plug in FIG. 1.
Figure 8:
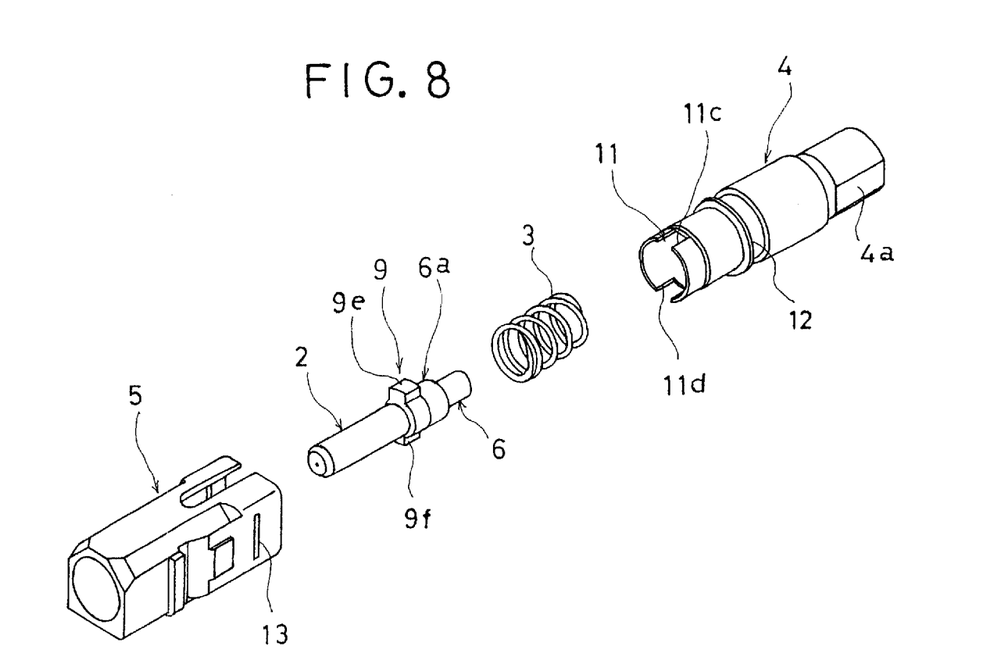
FIG. 8 is an exploded perspective view of an optical connector plug according to a second embodiment of the present invention.
Figure 9:
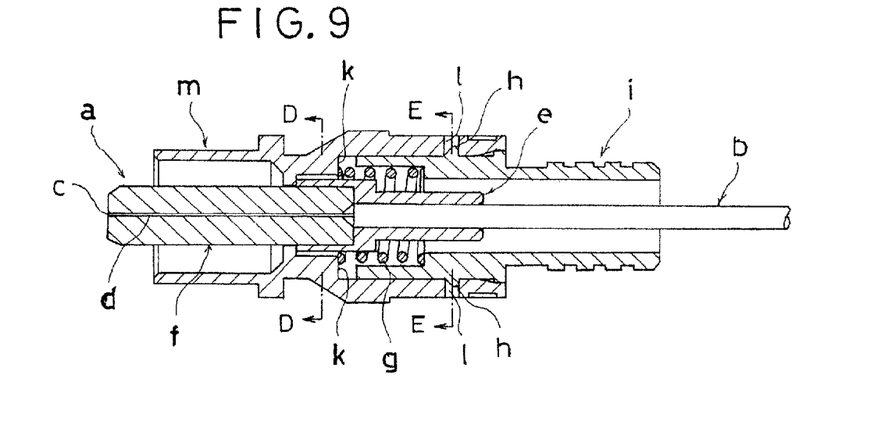
FIG. 9 is a longitudinal sectional view of a conventional optical connector.
Figure 10:
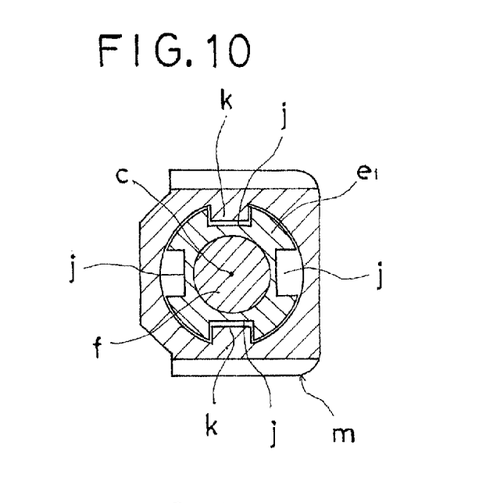
FIG. 10 is a sectional view taken on arrow D—D in FIG. 9.
Figure 11:
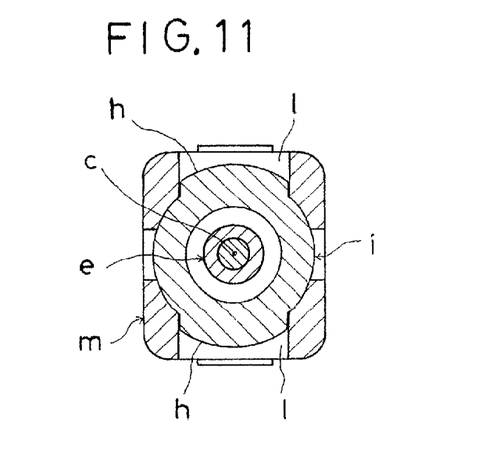
FIG. 11 is a sectional view taken on arrow E—E in FIG. 9.
Figure 12:
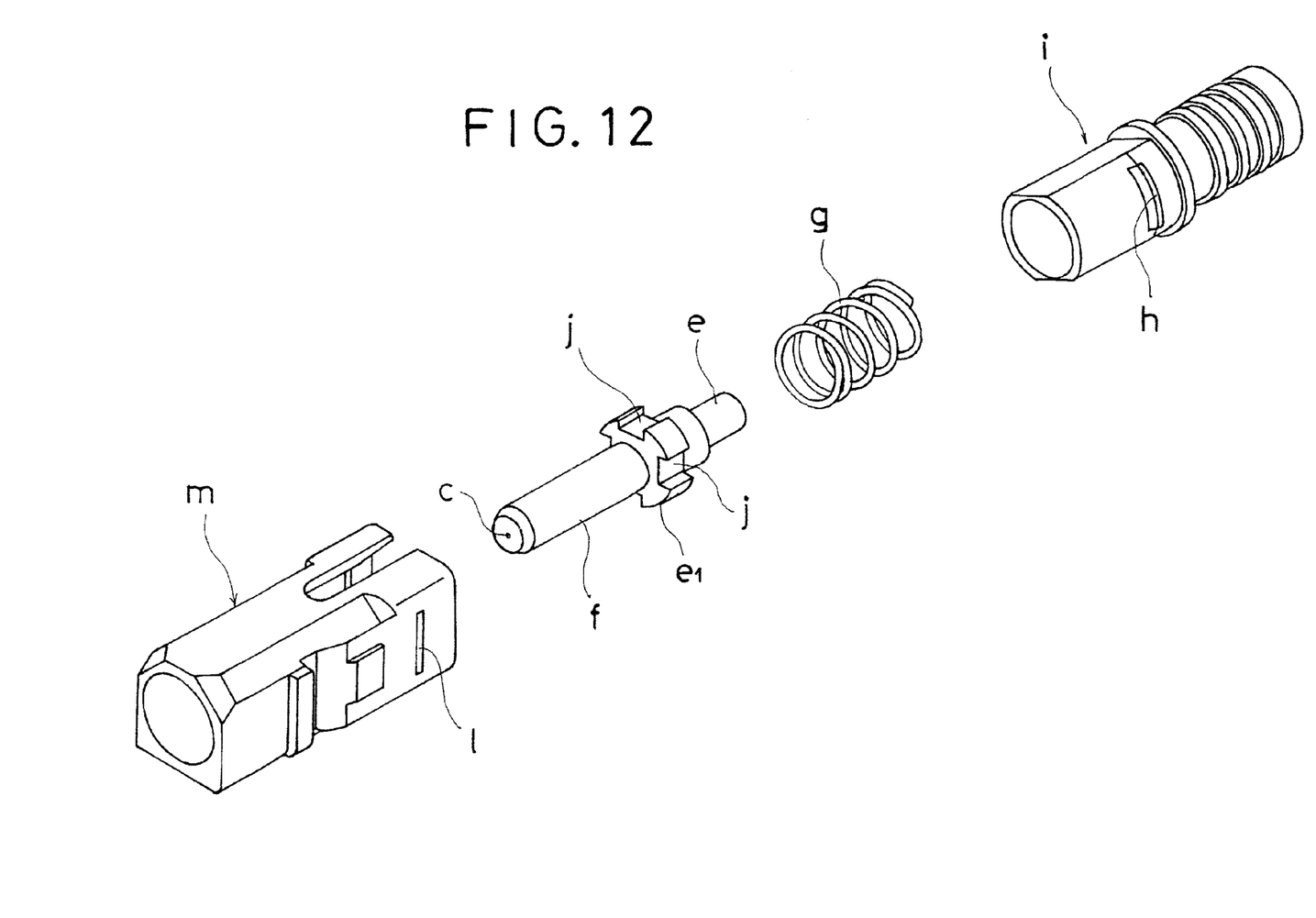
FIG. 12 is an exploded perspective view of the conventional optical connector plug.

FIG. 1 shows a longitudinal sectional view of an optical connector according to a first embodiment of the present invention, FIG. 2 shows a sectional view taken on arrow A—A in FIG. 1, FIG. 3 shows a sectional view taken on arrow B—B in FIG. 1, FIG. 4 shows an exploded perspective view of the optical connector plug in FIG. 1, FIG. 5 shows a side view of a plug frame of the optical connector plug, FIG. 6 shows a longitudinal half-sectional view taken on arrow C—C in FIG. 5, FIG. 7 shows a half sectional view of a stop ring in the optical connector plug, and FIG. 8 shows an exploded perspective view of an optical connector plug according to a second embodiment of the present invention.

According to the first embodiment of the present invention, as shown in FIGS. 1 and 4, an optical connector plug 1 mainly comprises a ferrule 2 which is fit and fixed into a rear end of a holder 6; a coil spring 3; a stop ring 4; a plug frame 5; and the holder 6.

As shown in FIG. 1, in the ferrule 2, an optical fiber 8a is formed by exfoliating a coating of one end of an optical fiber cable 8. The ferrule 2 is inserted into a microhole 7, which is inserted into a core of the optical fiber 8a and is fixed by adhering. The holder 6 is cylindrical-shaped and one end portion (fit into the ferrule 2) of the holder 6 has formed at a cylindrical enlarging portion 6a as shown in FIG. 4. A plurality of, e.g., four latching grooves 9a, 9b, 9c, and 9d, as an engaging portion 9, are formed at a peripheral surface of the enlarging portion 6a in a circumferential direction thereof at predetermined intervals, as shown in FIGS. 2 and 4.

Referring to FIGS. 1 and 7, the stop ring 4 is formed as a single substantially-cylindrical structure. A hook portion 10 of the ring-shaped coil spring 3 is formed, at an inside wall of the stop ring 4 at the front side thereof, to be directed to a front side (to be directed to the left in FIGS. 1 and 7). Both ends of the coil spring 3 are hooked to a rear end surface of the enlarging portion 6a of the holder 6 and the hook portion 10, and the coil spring 3 is armored by a rear portion of the enlarging portion 6a in the holder 6.

Referring to FIGS. 1, 2, 4, and 7, at one end of the stop ring 4, a pair of engaging projections 11a and 11b, as an engaging portion 11 which is engaged with a latching grooves 9a to 9c of the holder 6, is projected ahead to be opposed to each other. Incidentally, three or four enlarging projections may be provided corresponding to the number of latching grooves of the holder 6, e.g., four, and the position of the latching grooves.

Referring to FIGS. 1, 3, 4, and 7, at the periphery on the front side of the stop ring 4, a ring-shaped projected band 12 is fit into a pair of latching holes 13 and 13a of the plug frame 5, which will be described later. As shown in FIG. 1, the projected band 12 can easily be fit into the latching portions 13 and 13a by pressing the stop ring 4 into the plug frame 5 from the opening at a read end thereof. The projected band 12 has a front surface inclined, as a guide surface 12a, and a rear surface oriented in the vertical direction, as a latching surface 12b, in order to prevent the stop ring 4 to move in the axial direction after the fitting of the projected band 12. A chamfer 4a for facilitating the rotation is provided at a circumferential portion of a rear end of the stop ring 4.

Referring to FIGS. 1, 3, 5, and 6, in the plug frame 5, the pair of the latching holes 13 and 13a, which fits a circumferential end of the ring-shaped projected band 12 in the stop ring 4 into a rear portion of a circumferential wall 5a (in FIG. 6), is pierced long in a direction vertical to the core to be opposed to each other.

An inside wall 14 for abutting a front surface of the enlarging portion 6a of the holder 6, against elastic power of the coil spring 3, is provided close to a front end from a substantially intermediate portion in the plug frame 5. The ferrule 2 is inserted into a central hole 15 of the inside wall 14 movably in the axial direction. A front end of the ferrule 2 is projected from the plug frame 5 to the front. Incidentally, in FIG. 1, reference numeral 16 denotes a boot which armors a rear end of the stop ring 4 and the optical fiber cable 8.

As shown in FIG. 1, in the optical connector plug 1, in a state in which the optical fiber cable 8 and the holder 6 are inserted in the stop ring 4, both ends of the coil spring 3 are hooked to the rear end surface of the enlarging portion 6a of the holder 6 and the hook portion 10 of the stop ring 4, and coil spring 3 armors the rear of the holder 6. The front of the stop ring 4 is pressed in the plug frame 5 from the opening at a rear end of the plug frame 5, and the engaging projections 11a and 11b of the stop ring 3 are engaged with the latching grooves 9a and 9c or with the latching grooves 9b and 9d of the holder 6.

Further, the stop ring 4 is pressed, thereby, the ring-shaped projected band 12 of the stop ring 4 is fit into the latching holes 13 and 13a of the plug frame 5, and the assembling operation is finished. As shown in FIG. 3, the guide surface 12a and the latching surface 12b in FIG. 7, as symmetrical peripheral portions, of the ring-shaped projected band 12 are fit into the latching portions 13 and 13a. Hence, after the assembling operation, the stop ring 4 can be rotated round the axis, relative to the plug frame 5. The rotation of the stop ring 4 enables the holder 6 and the ferrule 2 to rotate round the axis. In this case, the ferrule 2, the coil spring 3, the stop ring 4, and the boot 16 are integrally rotated 360°.

The eccentric error of the ferrule 2 is adjusted in a single step by using the above rotating members and, thereafter, the adjusted position is fixed by pressure generated by pressing the coil spring 3 to the holder 6. However, the best adjusted position is moved upon movement by using the boot 16 or the like after the assembling operation and only the pressure generated by the coil spring 3 does not enable the adjusted position to completely be fixed. Consequently, an adhering agent (not shown) is filled and is fixed between the stop ring 4 and the plug frame 5.

Although the plug frame 5 is fixed as mentioned above and the stop ring 4 is rotated in the adjustment in a single step, the stop ring 4 may be fixed and the plug frame 5 may be rotated.

When the plug frame 5 is fixed and the stop ring 4 is rotated, the ferrule 2 is always rotated at the same position by the operation of the coil spring 3. Further, the ferrule 2 is not moved forward and backward and the pressure of the coil spring 3 is uniform.

Accordingly, the pair of optical connector plugs 1 is connected via an optical adapter, the ferrules 2 can always be faced each other with uniform pressure.

According to the first embodiment, the latching grooves 9a to 9d as the engaging portion 9 of the holder 6 are engaged with the engaging projections 11a and 11b as the engaging portion 11 of the stop ring 4. However, according to the second embodiment, as shown in FIG. 8, the engaging projections 9e and 9f as the engaging portion 9 of the holder 6 may be engaged with the latching grooves 11c and 11d as the engaging portion 11 of the stop ring 4.

Although the first and second embodiments relate to the optical connector plug having a core in the center of the optical fiber 8a, the present invention can be applied to an optical connector plug having a pair of stress applying portions at both sides of the core, namely, a polarization-preserving optical connector plug.

What is claimed is:

1. An optical connector plug comprising:

a holder having a ferrule at one end thereof; a stop ring for supporting the ferrule in a predetermined direction;

a plug frame for rotatably supporting and incorporating said stop ring in an axial direction; and a coil spring interposed between said holder and said stop ring, for energizing said ferrule to the front in said plug frame, wherein said holder and said stop ring have engaging portions with which they are mutually engaged, and an optical axis of the ferrule is adjusted in a single step by rotating said stop ring and fixing said plug frame or by rotating said plug frame and fixing said stop ring, and an adjusted position is fixed by pressure generated by pressing said spring to said holder and by using an adhering agent which is filled between said plug frame and said stop ring.

2. An optical connector plug comprising:

a holder having a ferrule at one end thereof; a stop ring for supporting the ferrule in a predetermined direction;

a plug frame for rotatably supporting and incorporating said stop ring in an axial direction; and a coil spring interposed between said holder and said stop ring, for energizing said ferrule to the front in said plug frame, wherein said holder and said stop ring have engaging portions with which they are mutually engaged, and the entire of said stop ring is formed as a single substantially-cylindrical structure, and said stop ring is rotated round the axis in said plug frame and is fit while it is prevented from the movement in the axial direction by using an adhering agent which is filled between said plug frame and said stop ring.

3. An optical connector plug according to claim 1, wherein the engaging portion of said holder is a latching groove, and the engaging portion of said stop ring is an engaging projection.

4. An optical connector plug according to claim 1, wherein the engaging portion of said holder is a latching projection, and the engaging portion of said stop ring is a latching groove.

5. An optical connector plug according to claim 2, wherein a pair of latching holes, which penetrated a circumferential wall of said plug frame to be opposed to each other, is provided and a ring-shaped projected band for being fit into said latching hole is provided to a circumferential portion of said stop ring.

* * * * *